United States Patent
Chung et al.

(10) Patent No.: US 10,508,179 B2
(45) Date of Patent: Dec. 17, 2019

(54) THERMOPLASTIC VULCANIZATE PREPARED WITH OIL-EXTENDED, BIMODAL METALLOCENE-SYNTHESIZED EPDM

(71) Applicant: ExxonMobil Chemical Patents Inc., Baytown, TX (US)

(72) Inventors: Oscar O. Chung, Houston, TX (US); Periagaram S. Ravishankar, Kingwood, TX (US); Porter C. Shannon, Seabrook, TX (US); John P. Soisson, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 152 days.

(21) Appl. No.: 15/881,843

(22) Filed: Jan. 29, 2018

(65) Prior Publication Data

US 2018/0244869 A1 Aug. 30, 2018

Related U.S. Application Data

(60) Provisional application No. 62/464,740, filed on Feb. 28, 2017.

(51) Int. Cl.
| | |
|---|---|
| *C08L 23/16* | (2006.01) |
| *C08J 3/24* | (2006.01) |
| *C08L 9/00* | (2006.01) |
| *C08L 23/12* | (2006.01) |
| *C08C 19/00* | (2006.01) |

(52) U.S. Cl.
CPC .......... *C08J 3/24* (2013.01); *C08C 19/00* (2013.01); *C08L 9/00* (2013.01); *C08L 23/12* (2013.01); *C08L 23/16* (2013.01); *C08J 2309/00* (2013.01); *C08J 2323/12* (2013.01); *C08J 2409/00* (2013.01); *C08J 2423/12* (2013.01)

(58) Field of Classification Search
CPC ...... C08J 3/24; C08J 2309/00; C08J 2323/12; C08J 2409/00; C08J 2423/12; C08C 19/00; C98L 9/00; C98L 23/12; C98L 23/16
USPC .......................................... 525/191
See application file for complete search history.

(56) References Cited

U.S. PATENT DOCUMENTS

| | | | |
|---|---|---|---|
| 7,696,276 B2 * | 4/2010 | Ellul | C08F 8/34 524/500 |
| 7,910,637 B2 | 3/2011 | Kiss et al. | |
| 7,915,354 B2 | 3/2011 | Wouters et al. | |

FOREIGN PATENT DOCUMENTS

| | | |
|---|---|---|
| EP | 0 552 945 A | 7/1993 |
| WO | 00/26296 A | 5/2000 |
| WO | 03/059963 A | 7/2003 |
| WO | 03/066725 A | 8/2003 |
| WO | 2008/016429 A | 2/2008 |
| WO | 2009/035579 A | 3/2009 |
| WO | 2009/123609 A | 10/2009 |
| WO | 2015/175117 A | 11/2015 |
| WO | 2016/076969 A | 5/2016 |

* cited by examiner

*Primary Examiner* — Kelechi C Egwim
(74) *Attorney, Agent, or Firm* — Chad A. Guice

(57) ABSTRACT

A process for producing a thermoplastic vulcanizate, the process comprising: (i) charging a reactor with an oil-extended olefinic copolymer rubber, where the rubber is synthesized by a single-site catalyst, characterized by a multi-modal molecular weight distribution, and includes greater than 10 parts by weight extender oil per 100 parts by weight rubber; (ii) charging the reactor, contemporaneously or sequentially with respect to the rubber, with a thermoplastic resin, an oil, and a cure system to provide a pre-vulcanized mixture; and (iii) mixing the rubber, thermoplastic resin, oil, and cure system at a temperature above the melt temperature of the thermoplastic resin to thereby cause dynamic vulcanization of the rubber and produce the thermoplastic vulcanizate.

15 Claims, No Drawings

THERMOPLASTIC VULCANIZATE PREPARED WITH OIL-EXTENDED, BIMODAL METALLOCENE-SYNTHESIZED EPDM

CROSS-REFERENCE TO RELATED APPLICATIONS

This application claims priority to U.S. Ser. No. 62/464,740, filed Feb. 28, 2017, herein incorporated by reference.

FIELD OF THE INVENTION

This disclosure relates to thermoplastic vulcanizates that are prepared with oil-extended, multimodal olefinic rubbers, and in particular bimodal metallocene-synthesized ethylene-α-olefin rubbers (such as EPDM rubbers).

BACKGROUND OF THE INVENTION

Thermoplastic vulcanizates (TPVs) comprise finely-divided rubber particles dispersed within a thermoplastic matrix. These rubber particles are crosslinked to promote elasticity. The dispersed rubber phase is typically referred to as the discontinuous phase, and the thermoplastic phase is typically referred to as the continuous phase, although co-continuous morphologies are possible.

Thermoplastic vulcanizates may advantageously be prepared by dynamically vulcanizing a rubber with a curative agent while the rubber is being mixed with a thermoplastic resin. The usefulness of these compositions can depend on the physical properties of the compositions as well as the aesthetics of the products prepared from the compositions. Some of the important physical properties of thermoplastic vulcanizate compositions include stress at break and maximum elongation, as well as resistance to compression set. Useful aesthetic characteristics include extrusion surface roughness (ESR).

Technologically useful thermoplastic vulcanizates, which have an advantageous balance of properties, have historically been prepared from mono-modal, high molecular weight ethylene-based elastomers such as ethylene-propylene (α-olefin)-diene (EPDM) elastomers. As the skilled person appreciates, high molecular weight EPDM elastomers may possess very high viscosities, e.g., Mooney viscosity greater than 200 ML(1+4@125° C.), which results in difficulties related to the processability of these polymers. Typically, these polymers are not processable when having Mooney viscosities above about 100 ML(1+4@125° C.). As a result, the EPDM often used in the manufacture of thermoplastic vulcanizates may include extender oil. The required level of extender oil can depend on the molecular weight of the elastomer, but is usually sufficient to reduce the apparent viscosity of the oil extended EPDM to a Mooney viscosity of about 100 ML(1+4@125° C.) or below. Commercially available, mono-modal high molecular weight EPDMs, which are useful in TPVs, typically contain from about 50 to about 125 phr (parts-by-weight per 100 parts-by-weight rubber) extender oil. For example, EPDM obtained under the tradename Vistalon™ 3666 (ExxonMobil Chemical Company) has been widely used for the manufacture of technologically useful thermoplastic vulcanizates.

Many attempts to alter the rubber used in the manufacture of thermoplastic vulcanizates have been reported. For example, WO 2009/123609 is directed to thermoplastic vulcanizates prepared by employing metallocene-synthesized bimodal EPDM polymer. This bimodal EPDM has an overall Mooney viscosity ML(1+4@125° C.) of at least 30, an average branching index that is greater than 0.8, and includes less than 10 parts by weight, per 100 parts by weight rubber, of extender oil. The EPDM is bimodal to the extent that it includes a first, high-Mooney polymer fraction having a Mooney viscosity MST(5+4@200° C.) of at least 120 and a second, lower-Mooney polymer fraction having a Mooney viscosity ML(1+4@125° C.) of less than 120. Both fractions, individually, are characterized by a molecular weight distribution of less than 4.

Bimodal EPDM terpolymers that have been prepared using Zeigler Natta catalysis have also been used in thermoplastic vulcanizates. For example, WO 2008/016429 is directed to thermoplastic vulcanizates prepared by using oil-extended bimodal EPDM having an oil-extended Mooney viscosity ML(1+4@125° C.) of from 20 to 70, a molecular weight distribution between 2 and 10, and a branching index between 0.3 and 1. The EPDM is bimodal to the extent that it includes a first polymer fraction having a Mooney viscosity MST(5+4@200° C.) between 30 and 100, and a second polymer fraction having a Mooney viscosity ML(1+4@125° C.) between 10 and 120.

Other potentially relevant references include U.S. Pat. No. 7,910,637, WO 2016/076969, WO 2009/035579, WO 2003/066725, and WO 2000/26296, and EP 552945.

While attempts to replace conventional oil-extended EPDM used in thermoplastic vulcanizates have proven useful, the ability to obtain certain aesthetic properties, such as extrusion surface roughness, that are equivalent to conventional oil-extended EPDM remains a challenge.

SUMMARY OF THE INVENTION

Embodiments of the invention relate to a process for producing a thermoplastic vulcanizate, the process comprising (i) charging a reactor with an oil-extended olefinic copolymer rubber, where the rubber is synthesized by a single-site catalyst, characterized by a multi-modal molecular weight distribution, and includes greater than 10 parts by weight extender oil per 100 parts by weight rubber; (ii) charging the reactor, contemporaneously or sequentially with respect to the rubber, with a thermoplastic resin, an oil, and a cure system to provide a pre-vulcanized mixture; and (iii) mixing the rubber, thermoplastic resin, oil, and cure system at a temperature above the melt temperature of the thermoplastic resin to thereby cause dynamic vulcanization of the rubber and produce the thermoplastic vulcanizate.

Other embodiments of the invention relate to a thermoplastic vulcanizate prepared by processes according to the foregoing embodiments.

Yet further particular embodiments employ an oil-extended olefinic copolymer rubber having multi-modality such that the rubber includes (i) a first, low-Mooney viscosity polymer fraction and (ii) a second, high-Mooney viscosity polymer fraction. In some aspects, the multimodal rubber is comprised of approximately half of the high-Mooney fraction (on the basis of total weight of the first and second fraction), such as 45 wt % or more, 50 wt % or more, or greater than 50 wt %. It may further be desirable to employ a rubber made by a process including in-line oil extension, such that extender oil is mixed with the bimodal rubber in its polymerization effluent after polymerization but before and/or during desolventization.

These and other features, aspects, and advantages of the present disclosure will be apparent to the ordinarily skilled artisan in light of the below detailed description of some particular embodiments.

DETAILED DESCRIPTION

Embodiments of the invention are based, at least in part, on the discovery of a process for making thermoplastic vulcanizates by using oil-extended bimodal rubber that has been synthesized by metallocene catalysis. While the prior art contemplates the use of metallocene-synthesized olefinic rubber for the production of thermoplastic vulcanizates, it has been observed that extruded products obtained from these thermoplastic vulcanizates do not have the same surface characteristics as when the thermoplastic vulcanizates are prepared using oil-extended mono-modal EPDM. Despite what has been taught in the prior art, it has now unexpectedly been discovered that useful thermoplastic vulcanizates, including those that produce extrudates with advantageous surface properties, can be prepared by employing certain oil-extended bimodal rubber that has been synthesized by metallocene catalysis.

Various specific embodiments, versions and examples of the invention will now be described, including preferred embodiments and definitions that are adopted herein for purposes of understanding the claimed invention. For instance, according to some embodiments, advantageous thermoplastic vulcanizates may be prepared using an oil-extended bimodal rubber characterized by relatively high Mooney viscosity. This may be accomplished by, e.g., preparing the bimodal rubber so as to include a first, low Mooney fraction, and a second, high Mooney fraction—such that the high Mooney fraction comprises approximately half or more of the bimodal rubber (on the basis of total weight of the first and second fraction), such as 45 wt % or greater, 50 wt % or greater, or greater than 50 wt %. According to particular embodiments, the bimodal rubber contains more of the high-Mooney fraction than the low-Mooney fraction. Furthermore, oil extension may advantageously be carried out such that the rubber is oil-extended after polymerization but before or during desolventization, as described in more detail herein. It is believed that these features of the rubber may provide a desirably higher-Mooney viscosity rubber compound, while at the same time allowing the compound to remain readily processable (e.g., by virtue of the method of oil extension), so as to achieve superior surface properties in thermoplastic vulcanizates made with such a rubber, among other advantages that will be apparent to the skilled artisan with the benefit of this disclosure.

While the following detailed description relates to these and other specific preferred embodiments, those skilled in the art will appreciate that these embodiments are exemplary only, and that the invention can be practiced in other ways. Any reference to the "invention" may refer to one or more, but not necessarily all, of the inventions defined by the claims. Further, all ranges disclosed herein are inclusive unless otherwise noted.

Thermoplastic Vulcanizate Composition

The thermoplastic vulcanizate composition of the instant disclosure includes a rubber phase including a cured multimodal olefinic rubber dispersed within a thermoplastic continuous phase. The rubber phase may be continuous or discontinuous and is cured by dynamic vulcanization. The thermoplastic vulcanizate may also include one or more additives such as oil.

Multimodal Olefinic Rubber

In one or more embodiments, the multimodal olefinic elastomeric copolymer includes at least two polymer fractions of ethylene-α-olefin-non-conjugated diene rubbers, which polymer fractions may include first and second polymer fractions. These rubbers include rubbery copolymers polymerized from ethylene, at least one α-olefin, and at least one polyene, preferably diene, monomer. These rubbers may be referred to as EPDM or bimodal EPDM.

The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The polyene monomers, preferably diene monomers, may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used, although it should be noted that the term "copolymer" is meant to include any polymer made from two or more monomers (including terpolymers, tetrapolymers, etc.), while "terpolymers" indicate the more specific copolymer made from three monomers, "tetrapolymers" indicate copolymers made from four monomers, etc.

In one or more embodiments, the first and second EPDM fractions may include greater than 20 wt %, in other embodiments greater than 40 wt %, and in other embodiments greater than 55 wt % ethylene-derived units. In these or other embodiments, the first and second EPDM fractions may include less than 85 wt %, in other embodiments less than 75 wt %, and in other embodiments less than 70 wt % ethylene-derived units. In one or more embodiments, the first and second EPDM fractions may include greater than 0.1 wt %, in other embodiments greater than 1.0 wt %, and in other embodiments greater than 2.0 wt % diene-derived unit. In these or other embodiments, the first and second EPDM fractions may include less than 12 wt %, in other embodiments less than 8 wt %, and in other embodiments less than 5 wt % diene-derived units. In one or more embodiments, the balance of the first and second EPDM fractions is made up of α-olefin.

Ethylene content may be determined by FTIR, ASTM D3900. ENB content is determined using FTIR according to ASTM D6047. The content of other diene if present can be obtained using $C^{13}$ NMR. Unless otherwise noted, ethylene wt % s or mole % s are corrected for measured diene by the following calculation: (% C2 (uncorr)/(100+% diene)*100), where % C2 (uncorr) is the uncorrected ethylene wt % or mole %, and % diene is the measured diene content (reported on the same basis, wt % or mole %, as ethylene content).

In one or more embodiments, the weight percent (based on total polymer weight) of ethylene in the first fraction and the weight percent of ethylene in the second fraction differ by no more than 20%, and in other embodiments by no more than 10% (i.e., such that where the first fraction comprises 60 wt % ethylene-derived units, the second fraction comprises between 50 and 70 wt % ethylene-derived units). The relative amount of each fraction can vary, and may depend, e.g., on the desired overall polymer polydispersity and resiliency. In other embodiments, both fractions contain the same or similar weight percent of diene, the weight percent in each fraction differing by no more than 8 wt %, in other embodiments no more than 3 wt %, in other embodiments no more than 2 wt %, and in other embodiments no more than 1 wt %.

In one or more embodiments, the first and second polymer fractions may be described with respect to the Mooney viscosity of the respective fractions. "Mooney viscosity," as used herein, is the Mooney viscosity of a polymer or polymer composition. Unless otherwise indicated, Mooney viscosity is measured using a Mooney viscometer according to ASTM D-1646, but with the following modifications/ clarifications of that procedure. First, sample preparation is carried out according to the following modifications/clarifications: sample polymer (250 g) is massed on a roll mill prior to testing. The mill temperature is 150° C.+/−5° C. instead of the 50+/−5° C. recommended in ASTM D-1646, because 50° C. may cause a mechanical degradation (breakdown) of the molecular chain. A piece of raw polymer sample undergoes 10 passes between the rolls, per the following procedure: (1) allow for sufficient gap between the cylinder to introduce the polymer and warm it up during the $1^{st}$ and $2^{nd}$ passes; (2) set the gap to 1.4 mm+/−0.1 before the $3^{rd}$ pass; (3) re-introduce the polymer sample (in the form of a sheet) and fold it on itself at each pass until the $9^{th}$ pass; (4) before the $9^{th}$ pass, set the gap to 2.0-2.5 mm, in order to produce a thick sample sheet of 8.0+/−0.5 mm Thereafter, the sample is die-cut, and the ASTM D-1646 viscosity measurement procedure followed. Further, although ASTM D-1646 allows for several options for die protection, should any two options provide conflicting results, PET 36 micron should be used as the die protection. In addition, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+/−3° C. for 30 min in air; ML as reported herein were determined after resting at 24+/−3° C. for 30 min in air.

The results of the viscosity test may be reported as (ML, 1+4@125° C.), where ML denotes use of the large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 (ML, 1+4@125° C.). Alternatively, the Mooney viscosity may be reported as 90 MU; in such instance, it should be assumed that the just-described method is used to determine such viscosity, unless otherwise noted (for instance, Mooney viscosity may be noted as being measured at (1+8@150° C.), indicating sample run time of 8 minutes, with test temperature of 150° C.).

The torque limit of the Mooney viscometer is about 100 Mooney units (MU). Mooney values greater than about 100 Mooney units generally cannot be measured under these conditions. In this event, a non-standard rotor design is employed with a change in Mooney scale that allows the same instrumentation on the Mooney viscometer to be used for more viscous polymers. This rotor is both smaller in diameter and thinner than the standard ML rotor, and thus it is termed MST (Mooney Small—Thin). MST methods may be used to determine viscosity of polymers having viscosity greater than 100 Mooney units as described in Col. 5, lines 15-52 of U.S. Pat. No. 9,006,332, which description is incorporated herein by reference. In particular, MST may be determined and reported as (MST, 5+4@200° C.), meaning a 5 minute pre-heat and 4-minute torque recording at 200° C. is used with the MST rotor. Further, if Mooney viscosity is reported herein as MU, MST, then it should be assumed unless otherwise noted that the just-described method for determining MST viscosity is used.

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm A spacer or a shim may be used to raise the shaft to the midpoint. The wear point (cone shaped protuberance located at the center of the top face of the rotor) shall be machined off flat with the face of the rotor.

In embodiments wherein the multimodal elastomer composition is a series reactor blend, it can be difficult, if not impossible, to measure the viscosity of the second polymer fraction alone, since the second fraction will be intermixed with the first polymer fraction in the effluent of the series polymerization process. However, the viscosity of the first reactor product (i.e., the first polymer fraction) may be directly measured by removing some product from the stream fed from the first reactor to the second reactor (see below for more details on series reactor blend polymerization). Such sample of first reactor product should be quenched and devolatilized by hot water to stop the polymerization and to remove excess solvent prior to subjecting the sample to the above-described Mooney viscosity measurement procedure (or to any other procedure for measuring properties, such as GPC for determining molecular weights). Further, the final product of the second series reactor (containing both first and second polymer fraction) may be directly analyzed (again, after quenching and devolatilization) to determine its Mooney viscosity. Knowing the overall blend viscosity and the first fraction's viscosity allows calculation of the second fraction's viscosity, using the relationship:

$$\log ML = n_A \log ML_A + n_B \log ML_B \quad (1)$$

where ML is the Mooney large viscosity of the blend of two polymers A and B each having individual Mooney viscosities $ML_A$ and $ML_B$, respectively (as measured by the same procedure, such as 1+8@150° C. as described above); and $n_A$ and $n_B$ represent the weight fractions of components A and B in the blend. In certain embodiments, a calculated Mooney viscosity of a second polymer fraction, especially when obtained by series reactors, may return a very high Mooney viscosity value, well over 100. Thus, notwithstanding the above discussion relating to the use of MST (Mooney small-thin) measurement methods for very high viscosity polymers, these calculated Mooney value are reported as (ML, 1+4@125° C.) based on the Mooney measurement methods used to obtain Mooney values for the (i) first fraction and (ii) overall blend.

With respect to the present invention, a factor of 5.13, which has been determined experimentally, is used to convert the polymer Mooney viscosity (MST, 5+4@200° C.) to Mooney viscosity (ML, 1+4@125° C.). In other words, (5.13)*(MST)=(ML).

In one or more embodiments, the first polymer fraction may be characterized by a Mooney viscosity (ML, 1+4@125° C.) that is less than 125, in other embodiments less than 100, and in other embodiments less than 75. In one or more embodiments, the first polymer fraction may be characterized by a Mooney viscosity (ML, 1+4@125° C.) of from about 10 to about 125, in other embodiments from about 15 to about 100, and in other embodiments from about 20 to about 75, with ranges from any of the foregoing low ends to any of the foregoing high ends also contemplated in various embodiments. The first polymer fraction may also or instead be referred to as a "low Mooney fraction," indicating its generally lower Mooney viscosity as compared to the second fraction.

In one or more embodiments, the second polymer fraction may be characterized by a Mooney viscosity MST (5+4@200° C.) that is greater than 30, in other embodiments greater than 40, and in other embodiments greater than 50. In one or more embodiments, the second polymer fraction may be characterized by a Mooney viscosity MST (5+4@200° C.) of from about 30 to about 150, in other embodiments from about 40 to about 140, and in other embodiments from about 50 to about 130, with ranges from any of the foregoing low ends to any of the foregoing high ends also contemplated in various embodiments. Stated another way, the first polymer fraction may be characterized by a Mooney viscosity (ML, 1+4@125° C.) of from about 154 to about 770, in other embodiments from about 205 to about 718, and in other embodiments from about 257 to about 667, again with ranges from any of the foregoing low ends to any of the foregoing high ends also contemplated in various embodiments. The second polymer fraction may accordingly also or instead be referred to as a "high Mooney fraction," indicating its generally higher Mooney viscosity as compared to the first fraction.

In one or more embodiments, the overall bimodal EPDM, without oil extension, may be characterized by a Mooney viscosity (ML, 1+4@125° C.) that is less than 150, in other embodiments less than 140, and in other embodiments less than 130. In one or more embodiments, the overall bimodal EPDM, without oil extension, may be characterized by a Mooney viscosity (ML, 1+4@125° C.) of from about 75 to about 150, in other embodiments from about 85 to about 140, and in other embodiments from about 95 to about 130, with ranges from any of the foregoing low ends to any of the foregoing high ends also contemplated in various embodiments.

In one or more embodiments, the overall bimodal EPDM, with oil extension, may be characterized by a Mooney viscosity (ML, 1+4@125° C.) that is less than 100, in other embodiments less than 85, and in other embodiments less than 70. In one or more embodiments, the overall bimodal EPDM, with oil extension, may be characterized by a Mooney viscosity (ML, 1+4@125° C.) of from about 30 to about 100, in other embodiments from about 40 to about 85, and in other embodiments from about 50 to about 70, with ranges from any of the foregoing low ends to any of the foregoing high ends also contemplated in various embodiments.

In one or more embodiments, the multimodal olefinic elastomeric copolymer includes at least 40 wt % of the second polymer fraction, such as at least 45 wt %, or at least 50 wt %. In yet further embodiments, the multimodal olefinic elastomeric copolymer includes greater than 50 wt %, in other embodiments greater than 52 wt %, and in other embodiments greater than 54 wt % of the second polymer fraction, with the foregoing wt % s being based upon the total weight of the first and second polymer fractions. Stated another way, the relative amounts of the first and second polymer fractions within the multimodal olefinic elastomeric copolymer may be described as a weight ratio of the first polymer fraction to the second polymer fraction. In one or more embodiments, the weight ratio of the first polymer fraction to the second polymer fraction may be from about 0.1:1 to about 1.5:1, such as within the range from 0.1:1 to 1.2, or from 0.1:1 to 1:1. In yet other embodiments, the weight ratio of first to second polymer fraction may be within the range from 0.1:1 to 0.9:1, in other embodiments from about 0.15:1 to about 0.85:1, and in other embodiments from about 0.2:1 to about 0.8:1. In specific embodiments the weight ratio of the first polymer fraction to the second polymer fraction is about 10:90, in other embodiments about 30:70, and in other embodiments about 45:55, although in certain other embodiments, it may be higher, such as about 60:40 or 55:45. According to certain embodiments, the multimodal olefinic elastomeric copolymer includes at least 50 wt % of the second, high-Mooney, fraction. In certain embodiments, the multimodal olefinic elastomeric copolymer includes more of the second, high-Mooney, fraction than the first, low-Mooney, fraction.

As suggested above, the bimodal EPDM is oil extended. In one or more embodiments, the bimodal EPDM may include greater than 10, in other embodiments greater than 20, and in other embodiments greater than 30 parts by weight extender oil per 100 parts by weight rubber (reported herein as 10, 20, or 30 "phr," respectively). In these or other embodiments, the bimodal EPDM may include less than 60, in other embodiments less than 50, and in other embodiments less than 40 phr extender oil. In one or more embodiments, the bimodal EPDM may include from about 10 to about 60, in other embodiments from about 20 to about 50, and in other embodiments from about 30 to about 40 phr extender oil, with ranges from any of the foregoing low ends to any of the foregoing high ends also contemplated in various embodiments.

Synthesis of Multimodal Olefinic Rubber

In one or more embodiments, the fractions can be obtained using series reactors as described below, or by using parallel reactors, or by mechanical blending.

When produced by direct polymerization, the catalyst may include a single-site catalyst, preferably a metallocene catalyst, generally with an activity and longevity sufficient to polymerize in a homogeneous environment at temperatures of at least 100° C. so that the different molecular weight fractions can be produced in successive reactors arranged in series by temperature and/or hydrogen control.

In one or more embodiments, the catalyst is a bulky ligand transition metal catalyst. The bulky ligand may contain a multiplicity of bonded atoms, preferably carbon atoms, forming a group, which may be cyclic with one or more optional hetero-atoms. The bulky ligand may be a cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a group 4, 5, or 6 transition metal of the Periodic Table of Elements. The transition metal atom is preferably a group 4 atom. While it is assumed that the transition metal in the active catalyst state is in the 4+ oxidation state and a positively charged cation, precursor transition metal complexes that are generally neutral may be in a lower oxidation state. Reference is made to U.S. Pat. No. 6,211,312 for a more detailed description of suitable metallocene complexes.

The catalyst is derivable from a compound represented by the formula:

$[L]_m M[X]_n$ wherein L is the bulky ligand; X is the leaving group, M is the transition metal and m and n are such that the total ligand valency corresponds to the transition metal valency. Preferably the catalyst is four coordinate such that the compound is ionizable to a 1+ valency state. The ligands L and X may be bridged to each other, and if two ligands L and/or X are present, they may be bridged. The metallocenes may be full-sandwich compounds having two ligands L which are cyclopentadienyl groups or half-sandwich compounds having one ligand L only which is a cyclopentadienyl group.

Metallocenes include those compounds that contain one or more cyclopentadienyl moieties (which may be substituted or unsubstituted) in combination with a transition metal of the Periodic Table of Elements. The metallocene catalyst component is represented by the general formula (Cp)mMRnR'p wherein Cp is a substituted or unsubstituted cyclopentadienyl ring; M is a group 4, 5, or 6 transition metal; R and R' are independently selected halogen, hydrocarbyl group, or hydrocarboxyl groups having 1-20 carbon atoms; m=1-3, n=0-3, p=0-3, and the sum of m+n+p equals the oxidation state of M In one or more embodiments, useful metallocenes include biscyclopentadienyl derivatives of a group 4 transition metal, preferably zirconium or hafnium. See WO 1999/41294. These may be derivatives containing a fluorenyl ligand and a cyclopentadienyl ligand (e.g., cyclopentadienyl-fluorenyl group 4 metal complexes), connected by a single carbon and silicon atom. (See WO 1999/45040; and WO 1999/45041). In certain embodiments, the Cp ring is unsubstituted and/or the bridge contains alkyl substituents such as alkylsilyl substituents to assist in the alkane solubility of the metallocene. See WO 2000/24792 and WO 2000/24793 (fully incorporated herein by reference). Other metallocene catalyst systems may show a polymerization capability suitable for making the composition according to the invention. For example, EP 418044 uses a monocyclopentadienyl compound similar to that of EP 416815. Similar compounds are described in EP 420436. WO 1997/03992 shows a catalyst in which a single Cp species and a phenol are linked by a C or Si linkage, such as Me2C(Cp)(3-tBu-5-Me-2-phenoxy)TiCl$_2$. WO 2001/05849 discloses Cp-phosphinimine catalysts, such as (Cp)((tBu)3P=N—)TiCl$_2$.

The catalyst may be used with a cocatalyst or activator which, it is assumed according to prevailing theory, helps form the metallocene cation. Aluminum alkyl derived activators may be used of which methyl alumoxane is a prime and well-known example. This material may also function as a scavenger and is commercially obtainable from Albemarle or Schering.

Non- or weakly-coordinating anion (NCA) generating activators of the type described in EP 277004 are preferred. These activators are often used and described in conjunction with the metallocene in the above metallocene patent references. NCAs may be generated from precursors which may be a neutral salt containing the stabilizing anion or a nonionic Lewis Base capable of abstracting a group from the transition metal complex to form a stabilizing anion. The NCA may, depending on mode of generation, have three or four ligands substituted on a metal atom such as boron or aluminum. Particularly useful activators in some embodiments include NCA activators such as those described in Paragraph [0124] of US 2015/0025209, and also those in Columns 7 and 20-21 in U.S. Pat. No. 8,658,556, which description is incorporated by reference.

In operation on a commercial scale, the high catalyst activity and low catalyst concentration lead to increased sensitivity to poisons. Poisons may enter into the polymerization reactor as impurities in the solvent or monomer feed or be generated by secondary processes such as the catalyst killing operation, generally performed with water after polymerization proper is completed.

These poisons may be deactivated by using an alkyl aluminum scavenger such as triethylaluminum, (TEAL), titanium boron aluminum (TIBAL) or n-octyl aluminum. The presence of poison can also be countered by providing a molecular sieve or other purifying installation as part of the recycle in the continuous reactor lay out.

Conditions as between the first and the second reactor may be differentiated as described in WO 1999/45047. Generally a terpolymer (containing a suitable diene) is made using ethylene, higher α-olefin (e.g. propylene, butylene, hexene, and octene) and non-conjugated diene in a process which comprises: a) feeding a first set of monomers containing a diene to a first reactor, b) adding a single site catalyst to the first reactor, c) operating the first reactor to polymerize the first set of monomers to produce an effluent containing a first polymer component and optionally unreacted monomers, d) feeding the effluent of c) to a second reactor, e) feeding a second set of monomers to the second reactor, f) operating the second reactor to polymerize the second set of monomers and any unreacted monomers to produce a second polymer component. Optionally, additional catalyst may also be fed to the second rector. The final polymer product comprises the mixture of said first and second polymer components.

After polymerization and any catalyst deactivation or killing, the solvent can be removed by one or more flashing steps or a liquid phase separation as described in EP 552945 so that the solvent content is lowered to 0.1 wt % or less. The solvent can be recycled and the polymer baled or pelletized. Incorporation of Oil and Isolation of Oil-Extended Bimodal Rubber Following completion of the synthesis of the bimodal rubber composition, extender oil (which may also be referred to as plasticizer) can be incorporated into the bimodal rubber composition to form an oil-extended bimodal rubber composition. Preferably, extender oil (plasticizer) is incorporated into the polymer reactor effluent downstream of the polymerization reactor and before and/or during removal of the solvent (e.g., by devolatilization and/or other similar separations processes known for desolventizing solution polymerization effluent). This may improve the dispersion of the oil. The desolventation is then preferably carried out so as not to remove the extender oil, or to remove as little extender oil as possible.

For example, useful techniques are disclosed in U.S. Pat. No. 7,910,637 (in particular column 20, line 19—column 27, line 67 & column 35, line 9—column 38, line 51), as well as in WO 2016/076969 (in particular Paragraphs [0013]-[0015], [0019]-[0022], & [0056]-[0067]), which descriptions are incorporated herein by reference. Such techniques could be employed in, e.g., a polymerization system such as that described in FIG. 1 and columns 14-20 of U.S. Pat. No. 6,881,800, which description is also incorporated herein by reference. According to these teachings, in-line blending may include (A) polymerizing olefin monomers having two or carbon atoms (preferably including ethylene and one or more higher α-olefins, optionally also including one or more diene monomers) in the presence of a polymerization catalyst (preferably a single-site catalyst, such as a metallocene catalyst, in accordance with the previous description) in a polymerization reactor train including one reactor or two or more serially configured reactors, or parallel-configured reactors in fluid communication so as to form a combined effluent stream; and (B) obtaining a polymer reactor effluent including a homogeneous fluid phase polymer-monomer mixture from the reactor train. Processes may further include (C) adjusting temperature and/or pressure of the homogeneous fluid phase polymer-monomer mixture so as to create two fluid phases including (i) a polymer-rich phase and (ii) a polymer-lean phase. This can be accomplished, e.g., by utilizing a phase separator such as a high pressure separator and maintaining the temperature and pressure within the phase separator above the solid-fluid phase transition point but below the cloud point pressure and temperature, as described in connection with FIG. 2 in U.S. Pat. No. 6,881,800, and as described in Paragraphs [0057] and [0058] of WO 2016/076969, which descriptions are incorporated herein by reference. The process further comprises (D) separating the polymer-lean phase from the polymer-rich phase (which may be done, e.g., in the phase separator in which the two fluid phases are created, or which may be done via a distinct separator downstream of the creation of the two liquid phases); and (E) devolatilizing (e.g., using an extruder, kneader, or other suitable devolatilizing equipment known in the art of polymerization, corresponding to the extruder 40 described in U.S. Pat. No. 6,881,800) the polymer-rich phase so as to remove volatile components from the polymer-rich phase, leaving a solid polymer product (e.g., the oil-extended multimodal olefinic copolymer rubber such as oil-extended bimodal EPDM) with under 5 wt %, preferably under 1 wt %, more preferably under 0.5 or even 0.1 wt %, volatile components (including water). The process further comprises (F) adding extender oil (which may be purified, e.g., as described in WO 2016/076969) to the process after (B) and before or during (E). In some particular embodiments, extender oil is added to the process during or after (C) and before or during (E), or, in certain embodiments, during or after (D) and before or during (E). For instance, such embodiments may include adding extender oil to the process after the formation of the two fluid phases and before or during devolatilization, such that the extender oil can be added to the two fluid phases (e.g., the liquid-liquid two phase system) and/or to the polymer-rich phase. The extender oil may furthermore be added prior to, rather than during, devolatilization in such embodiments.

In certain other embodiments, the extender oil may be added to the polymer reactor effluent prior to the creation of the two fluid phases (e.g., prior to (C)). For instance, in certain embodiments, the polymer and purified extender oil may be combined upstream of a phase separator, optionally passing the mixed stream through one or more static mixers before entering the said separator to enhance mixing. The pressure within the separator vessel may be maintained below the cloud point pressure to form or maintain two fluid phases including a polymer-oil-rich fluid phase and a monomer-rich fluid phase. The temperature in the separator may be maintained above the solid-fluid phase transition temperature to allow the formation and settling to the bottom of a continuous layer a higher-density, well-mixed fluid polymer-oil-rich blend phase, and the formation and rising to the top of a continuous layer of a lower-density monomer-solvent-rich (polymer-lean) phase. The monomer-rich phase may be separated from a polymer-oil-rich blend phase, and the separated monomer-rich/polymer-lean phase recycled directly or after further treatment to the polymerization train. Optionally, the pressure of the first polymer-oil-rich blend phase upstream of or in a low-pressure separator may be reduced to achieve another fluid-fluid separation into a more concentrated polymer-oil-rich fluid phase, and another monomer-rich/polymer-lean phase. The temperature here may be maintained above the solid-fluid phase transition temperature by optionally further heating the first polyolefin-oil rich blend stream.

Extender Oils

The term "oil" generally refers to a compound including carbon and hydrogen that is a liquid at 25° C. As used herein, oil may include "extender oil" and "process oil." Extender oil is oil that is incorporated into the bimodal rubber composition to form an oil-extended rubber. Process oil refers to oil that is added to the oil-extended rubber, thermoplastic polymer, and other components in forming the thermoplastic vulcanizate. Any oil suitable as an extender oil is also suitable as a process oil; the terms "extender oil" and "process oil" are simply meant to distinguish the point of the overall manufacturing process at which the oil is incorporated into a given compound, which may impact resulting properties of the thermoplastic vulcanizate. That is, a given thermoplastic vulcanizate may include a total of 150 phr oil, but that thermoplastic vulcanizate's properties may be different depending on what fraction of that 150 phr of oil is incorporated into the rubber as extender oil, versus added to the oil-extended rubber, thermoplastic polymer, and other components as part of the process of forming the thermoplastic vulcanizate.

Examples of useful oils include various types of paraffins and paraffin blends, dearomaticized aliphatic hydrocarbons, high purity hydrocarbon fluids, polyalphaolefins, polybutenes, mineral oils, and the like. In an embodiment, the oils may include, or may consist essentially of, one or more paraffins. The term "paraffin" includes all isomers such as normal or linear paraffins (n-paraffins), branched paraffins, also referred to as isoparaffins, and cyclic paraffins, preferably cyclic aliphatic paraffins. Paraffins may be derived synthetically by means known in the art, or may be refined from crude oil in such a way as to meet the requirements of an extender oil as described herein. It is to be understood that the classes of materials described herein that are useful as extender oils can be utilized alone, or admixed with other extender oils, other plasticizers, and the like, in order to obtain the recited properties.

In an embodiment, an extender oil may include, or may consist of or consist essentially of one or more $C_6$ to $C_{200}$ paraffins, or in other embodiments $C_8$ to $C_{100}$ paraffins. "Consist essentially of" in this context allows for small amounts (less than 0.5 wt %) of impurities (different size hydrocarbons, trace impurities typical to the production process, etc.).

In one or more embodiments, the extender oil may include a branched paraffin, which may also referred to as an isoparaffin. Isoparaffins possess $C_1$ to $C_{10}$ alkyl branching along at least a portion of the paraffin chain. More particularly, the isoparaffins include saturated aliphatic hydrocarbons whose molecules have at least one carbon atom bonded to at least three other carbon atoms or at least one side chain (i.e., a molecule having one or more tertiary or quaternary carbon atoms), and in other embodiments wherein the total number of carbon atoms per molecule is in the range between 6 to 50, in other embodiments between 10 and 24, in other embodiments from 10 to 15. Various isomers of each carbon number may be present. Suitable isoparaffins for use as extender oils may also include cycloparaffins having branched side chains. Cycloparaffins may also exist as a minor component of a particular isoparaffin.

The extender oil may comprise at least 50 wt %, in other embodiments at least 60 wt %, in other embodiments at least 70 wt %, in other embodiments at least 80 wt %, in other embodiments at least 90 wt %, in other embodiments at least 95 wt % in other embodiments essentially 100 wt % of $C_6$ to $C_{150}$ isoparaffins. In other embodiments, the extender oil comprises $C_6$ to $C_{100}$ isoparaffins, in other embodiments $C_6$ to $C_{25}$ isoparaffins, or in other embodiments $C_8$ to $C_{20}$ isoparaffins.

In another embodiment, the extender oil may include a paraffin blend of two or more cyclic, branched, or normal paraffins. Preferred blends have a KV of 2 cSt or less at 100° C. Paraffins in the blends in other embodiments comprise from 6 to 50 carbon atoms, or in other embodiments 10 to 24 carbon atoms. The paraffin blends may have a branch paraffin to n-paraffin molar ratio (moles branched paraffin: moles n-paraffin) of 0.5:1 to 9:1, in other embodiments 1:1 to 4:1, based on the total moles of paraffin present in the blend.

In an embodiment, the extender oil may include a dearomaticized aliphatic hydrocarbon, which includes normal paraffins, isoparaffins and/or cycloparaffins. Particular dearomaticized aliphatic hydrocarbons may have a KV of 2 cSt or less at 100° C., and in other embodiments comprise at least 50 wt %, in other embodiments at least 60 wt %, in other embodiments at least 70 wt %, in other embodiments at least 80 wt %, in other embodiments at least 90 wt %, in other embodiments at least 95 wt %, in other embodiments essentially 100 wt % of dearomaticized aliphatic hydrocarbon. Exemplary dearomaticized aliphatic hydrocarbons may include a mixture of $C_4$ to $C_{25}$ normal paraffins, isoparaffins and cycloparaffins, in other embodiments $C_5$ to $C_{18}$, sor in other embodiments $C_5$ to $C_{12}$. Specific dearomaticized aliphatic hydrocarbons may contain less than 0.1 wt %, in other embodiments less than 0.01 wt % aromatics, based on the total weight of the dearomaticized aliphatic hydrocarbon.

The extender oil of various embodiments may include a "high purity" hydrocarbon fluid, in other embodiments comprising one or more paraffins having 6 to 1500 carbon atoms, in other embodiments 8 to 1000 carbon atoms, in other embodiments 10 to 500 carbon atoms, in other embodiments 12 to about 200 carbon atoms, in other embodiments 14 to 150 carbon atoms, in other embodiments 16 to 100 carbon atoms. The high purity hydrocarbon fluid composition may have an isoparaffin:n-paraffin ratio of about 0.5:1 to about 9:1, in other embodiments about 1:1 to about 4:1. The isoparaffins of the "high purity" hydrocarbon fluid composition may contain greater than fifty percent mono-methyl species, e.g., 2-methyl, 3-methyl, 4-methyl, 5-methyl or the like, with minimum formation of branches with substituent groups of carbon number greater than 1, i.e., ethyl, propyl, butyl or the like, based on the total weight of isoparaffins in the mixture. In other embodiments, the isoparaffins of the "high purity" hydrocarbon fluid composition contain greater than 70% of the mono-methyl species, based on the total weight of the composition.

In one or more embodiments, the extender oils may include a Poly-Alpha-Olefin (PAO), which include oligomers of branched and/or linear alpha-olefins. PAOs useful in the present invention comprise $C_{20}$ to $C_{1500}$ paraffins, in other embodiments $C_{40}$ to $C_{1000}$ paraffins, in other embodiments $C_{50}$ to $C_{750}$ paraffins, in other embodiments $C_{50}$ to $C_{500}$ paraffins. Particular PAO's comprise linear alpha-olefins having 5 to 14 carbon atoms, in other embodiments 6 to 12 carbon atoms, in other embodiments 8 to 12 carbon atoms, or in other embodiments an average of about 10 carbon atoms.

In one or more embodiments, useful polybutenes include homopolymers or copolymers of olefin derived units having from 3 to 8 carbon atoms, in other embodiments from 4 to 6 carbon atoms. In particular embodiments, the polybutene is a homopolymer or copolymer of a $C_4$ raffinate. Examples of suitable polybutene polymers are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999). Suitable polybutenes may include a copolymer comprising isobutylene derived units, 1-butene derived units, and/or 2-butene derived units. In yet another embodiment, the polybutene is a homopolymer or copolymer of isobutylene and 1-butene Mineral oils, which are distinguished by their viscosity indices determined according to ASTM D-2270, and by the amount of saturates and sulfur they contain, may include hydrocarbon basestocks that have been classified as Group I, II or III by the American Petroleum Institute (API). Group I basestocks are solvent refined mineral oils and contain the most unsaturates and sulfur of the three groups, and have the lowest viscosity indices. Group II and Group III basestocks are referred to as High Viscosity Index and Very High Viscosity Index basestocks, respectively and may include hydroprocessed mineral oils. The Group III oils contain less unsaturates and sulfur than the Group I oils, and have higher viscosity indices compared to Group II oils.

Thermoplastic Polymer

The thermoplastic polymer, which may also be referred to as a thermoplastic resin, may include those thermoplastic polymers that have been employed in the manufacture of thermoplastic vulcanizates as taught in the art. For example, these thermoplastic polymers, which may be referred to as thermoplastic resins or unfunctionalized thermoplastics, may include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, See U.S. Pat. No. 6,867,260 B2. Copolymers available under the tradename VISTAMAXX™ (ExxonMobil Chemical Company) are specifically included. Other polyolefin copolymers may include copolymers of olefins with styrene such as styrene-ethylene copolymer or polymers of olefins with αβ-unsaturated acids, αβ-unsaturated esters such as polyethylene-acrylate copolymers. Non-olefin thermoplastic polymers may include polymers and copolymers of styrene, αβ-unsaturated acids, αβ-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at least 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by an Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg@230° C.) of less than 100 dg/min, in other embodiments less than 50 dg/min, in other embodiments less than 10 dg/min, and in other embodiments less than 5 dg/min. In these or other embodiments, the propylene-based polymers can have a MFR of at least 0.1 dg/min, in other embodiments 0.2 dg/min and in other embodiments at least 0.5 dg/min.

In one or more embodiments, useful propylene-based polymers can have a melt temperature ($T_m$) that is from about 110° C. to about 170° C., in other embodiments from about 140° C. to about 168° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° C. to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg@230° C.) that is less than or equal to 10 dg/min, in other embodiments less than or equal to 1.0 dg/min, and in other embodiments less than or equal to 0.5 dg/min.

Curatives

The thermoplastic vulcanizate feedstock prepared according to the present invention may be dynamically vulcanized by employing conventional cure systems. Examples include phenolic resin cure systems, silicon-containing cure systems, and peroxide cure systems (i.e., free-radical cure systems).

Useful phenolic cure systems are disclosed in U.S. Pat. Nos. 2,972,600, 3,287,440, 5,952,425 and 6,437,030. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins are employed. The blend includes from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one embodiment, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula:

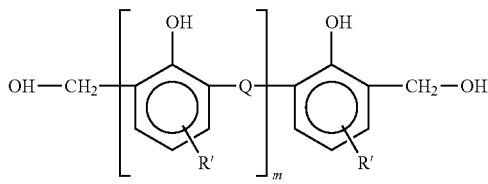

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer. Useful zinc oxide includes that conventionally employed for rubber processing. In one or more embodiments, the zinc oxide can have a mean particle diameter of about 0.05 to about 0.15 µm. Useful zinc oxide can be obtained commercially under the tradename Kadox™ 911 (Horsehead, Corp.), and/or Zoco™ 102 (Zochem). In these or other embodiments, the phenolic resin can be used in conjunction with an acid scavenger, such as a hydrotalcite, which may be added downstream of cure.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purpose of U.S. patent practice. In certain embodiments, cure systems such as those described in U.S. Pat. No. 6,747,099, U.S. Application Publication No. 2004/0195550, and International Patent Application Publication Nos. 2002/28946, 2002/077089, and 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and αβ-ethylenically unsaturated metal carboxylates are useful, as disclosed in U.S. patent application Ser. No. 11/180,235. Coagents may also be employed as neat liquids or together with a carrier. For example, the multi-functional acrylates or multi-functional methacrylates together with a carrier are useful, as disclosed in U.S. patent application Ser. No. 11/246,773. Also, the curative and/or coagent may be premixed with the plastic prior to formulation of the thermoplastic vulcanizate, as described in U.S. Pat. No. 4,087,485.

The skilled artisan will be able to readily determine a sufficient or effective amount of curative and/or coagent to be employed without undue calculation or experimentation. Those skilled in the art appreciate that the amount of curative employed may vary based upon the chemical nature of the peroxide and/or coagent employed. In these or other embodiments, the amount of curative employed may vary based upon the type of rubber employed, as well as the cross-linkable units present within the rubber.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of group 10. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

Other Constituents

As suggested above, the thermoplastic vulcanizates of the invention may optionally include one or more process oils (aromatic, paraffinic and napthathenic mineral oils, such as any oil suitable as an extender oil as discussed previously), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, desiccants, stabilizers, light stabilizer, light absorber, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Amounts

In one or more embodiments, the thermoplastic vulcanizates of this invention may contain a sufficient amount of the rubber to form rubbery compositions of matter. The skilled artisan will understand that rubbery compositions of matter include those that have ultimate elongations greater than 100 percent, and that retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 wt %, in other embodiments at least about 45 wt %, in other embodiments at least about 65 wt %, and in other embodiments at least about 75 wt % of rubber (i.e., dynamically-vulcanized rubber) based upon the total weight of the thermoplastic vulcanizates. In these or other embodiments, the amount of rubber within the thermoplastic vulcanizates can be from about 15 to about 90 wt %, in other embodiments from about 45 to about 85 wt %, and in other embodiments from about 60 to about 80 wt %, based on the entire weight of the rubber and thermoplastic combined.

In one or more embodiments, the amount of thermoplastic polymer (i.e., uncured polymer within the thermoplastic phase) within the thermoplastic vulcanizates can be from about 10 to about 85 wt %, in other embodiments from about 10 to about 40 wt %, and in other embodiments from about 12 to about 30 wt %, based on the entire weight of the rubber and thermoplastic combined. In these or other embodiments, the amount of thermoplastic polymer within the thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the oil, the thermoplastic vulcanizate may include from about 25 to about 300 parts by weight, or from about 50 to about 250 parts by weight, or from about 75 to about 200 parts by weight, of oil (including both extender oil and process oil) per 100 parts rubber, also referred to as "phr" (which is on the basis of weight per 100 parts weight of rubber unless otherwise specified). The quantity of process oil added may depend upon the properties desired, with the upper limit depending upon the compatibility of the particular oil and blend ingredients; this limit is exceeded when excessive exuding of oil occurs. The amount of oil may depend, at least in part, upon the type of rubber. High viscosity rubbers are more highly oil extendable.

Fillers, such as carbon black, clay, talc, or calcium carbonate may be added in amount from about 1 to about 250 phr, in other embodiments from about 10 to about 150 phr, and in other embodiments from about 25 to about 50 phr. The amount of carbon black that can be used may depend, at least in part, upon the type of carbon black and the amount of extender oil that is used.

Preparation of Thermoplastic Vulcanizate

As is known in the art, thermoplastic vulcanizates may be prepared by dynamic vulcanization of the rubber in the presence of a non-vulcanizing thermoplastic polymer. Dynamic vulcanization includes a vulcanizing or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628, 4,594,390, 5,656,693, 6,147,160, and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. In particular embodiments, process oil is introduced to the mixture. In certain embodiments, the addition of sufficient process oil allows for the achievement of particular advantageous properties of the thermoplastic vulcanizate.

According to the embodiments disclosed herein, the oil-extended multimodal elastomer composition (also referred to by the short-hand of oil-extended bimodal EPDM, although it is reiterated that multimodal elastomers according to the description above are also contemplated instead of or in addition to bimodal EPDM) is charged to a continuous reactor, such as an extruder, as an oil-extended rubber. Prior to charging the oil-extended EPDM to the reactor, the oil-extended EPDM (rubber) may be mechanically treated. For example, the rubber may be ground or chopped to facilitate feeding the reactor. The oil-extended rubber is fed to the main feed throat along with other solid ingredients such as the thermoplastic resin and any fillers that may be added to the composition. Initial mixing and masticating of the solids ingredients takes place within the initial zones that are downstream of the feed throat. The temperature of the materials is increased to above the melt temperature of the thermoplastic resin.

In one or more embodiments, additional process oil may be added downstream of the feed throat but prior to the addition of the curative. Any extender oil incorporated within the rubber plus any process oil added to the extruder prior to the curative may be referred to as pre-cure oil. In one or more embodiments, the process of this invention may include the addition of from about 50 to about 120, in other embodiments from about 60 to 100, or in other embodiments from about 70 to about 90 phr pre-cure oil, with ranges from any of the foregoing low ends to any of the foregoing high ends also contemplated in various embodiments.

The curative, which may be introduced to the extruder as a mixture with a carrier such as an oil, is added sufficiently downstream to allow the initial ingredients to become well mixed. Mixing at temperatures above the melt temperature of the thermoplastic resin continues throughout dynamic vulcanization, which takes place rapidly after introduction of the curative.

Following introduction of the curative, and in certain embodiments sufficiently downstream of where the curing of the rubber takes place, additional process oil may be added to the materials within the extruder. These additional process oils may be referred to as post-cure oils. In one or more embodiments, the process of this invention may include the addition of from about 10 to about 90, in other embodiments from about 20 to 80, or in other embodiments from about 30 to about 60 phr post-cure oil, with ranges from any of the foregoing low ends to any of the foregoing high ends also contemplated in various embodiments. The product is then conveyed out of the extruder to, for example, a finishing device such as a pelletizer.

Product Characteristics

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

In various embodiments, the produced TPV may exhibit extrusion surface roughness (ESR) within the range from a low of 55, 60, 65, or 70 micro-inches to a high of 65, 70, 75, 80, or 85 micro-inches (such as, e.g., from 55 to 65 micro-inches, or 55 to 85, or 60 to 70, etc.). ESR is determined in accordance with the procedure outlined in the example below. Lower ESR is preferred, such as within the range from 55 to 75 or even 55 to 70, or 55 to 65.

Also or instead, TPVs made according to some embodiments may exhibit any one or more of the following properties:

Hardness (Shore A) determined according to ISO 868 with a fifteen-second time interval within the range from 55 to 80, such as within the range from 60 to 75, or 65 to 70, with ranges from any of the foregoing low ends to any of the foregoing high ends also contemplated in various embodiments;

LCR (Laboratory Capillary Rheometer) viscosity within the range from 75 to 100 Pa*sec, such as within the range from 80 to 95, or 85 to 90, with ranges from any of the foregoing low ends to any of the foregoing high ends also contemplated in various embodiments. LCR viscosity is determined in accordance with the description in the Examples below.

Compression set (CSET) measured per ASTM D-412 (Die C, 100% strain for 22 hrs at 70° C., quiescent relaxation for at least 12 hours) within the range from 15 or 20 to 30 or 35, and/or CSET measured per the same technique but at 100% strain for 70 hours at 125° C. within the range from 35 or 40 to 55 or 60;

Modulus at 100% elongation ("M100") within the range from 8.00 to 10.00 MPa. The M100 measures the force required to maintain a sample of the TPV at 100% elongation, per cross-sectional area of un-elongated sample. It indicates the degree of flexibility/stiffness of the article.

Articles of Manufacture

The thermoplastic elastomers of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, glass run channels, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

EXAMPLES

In order to demonstrate the practice of the present invention, the following examples have been prepared and tested. The examples should not, however, be viewed as limiting the scope of the invention. The claims will serve to define the invention.

Two bimodal EPDM polymers were synthesized generally in accordance with the procedures described in U.S. Patent Application Publication No. 2003/0162926. Generally, polymerizations were carried out in parallel within two reactors with continuous flow of feeds into the respective reactors and continuous withdrawal of products from the respective reactors. The product streams, which existed in solution, were blended within a third reactor vessel. The feed into each reactor included ethylene, propylene and ENB, which were combined into single respective streams with hexane along with a hexane solution of triisobutyl aluminum scavenger to reduce the level of catalyst poisons. The catalyst, which included (bis(methyl)(cyclopentadienyl)(di (4-triethylsilyl-phenyl-)(methyl)-9-(2,7-di-tert-butyl-fluorenyl-)hafnium) and activator (N,N-dimethyl anilinium(tetrakis pentafluorophenyl borate), was pre-mixed in toluene and pumped, separately from the monomer feed, to the respective reactors. The product blend solution was oil extended by the addition of paraffinic oil to the solution blend in an amount as provided in Table I. The oil-extended blend was then desolventized to remove the volatile solvents. Polymer samples from the respective reactors were subject to Mooney viscosity testing as described herein. Specifically, high viscosity polymer, which was synthesized in the first reactor (fraction 1), was analyzed by employing the MST method described herein, and the polymer synthesized in the second reactor (fraction 2), which had a lower viscosity, was analyzed by employing the ML method described herein. The Mooney measurements obtained using the MST method were converted to ML units by multiplying MST by 5.13. Relevant data for each polymer fraction (i.e. samples from the first and second reactors), as well as the bimodal polymer product, are set forth in Table I as EPDM 1 and EPDM 2.

Two additional EPDM bimodal oil-extended polymers were prepared using the same catalyst as set forth above, except these additional polymers were prepared in series; i.e. a first polymer fraction was prepared in a first reactor, and the product of the first reactor was transferred to a second reactor where additional monomer and catalyst were introduced to synthesize the second polymer fraction. Polymer product from the second reactor was transferred to a third vessel where oil extension took place. The amount of oil extension for each polymer is provided in Table I.

Polymer samples were pulled from the first two reactors, blended with oil, (fraction 1 and fraction 2), desolventized, and analyzed for Mooney viscosity. Specifically, as shown in Table I for EPDM 3 and EPDM 4, the polymer sampled from the first reactor was analyzed using the ML method described herein, and the polymer sampled from the second reactor was analyzed using the MST method described herein. The Mooney viscosity of the polymer prepared in the second reactor was calculated by using the relationship log $ML = n_A \log ML_A + n_B \log ML_B$, which is described in detail above, and which included calculating the Mooney ML from the measured Mooney MST, which calculated information is provided in the Table as ML (zero oil).

After oil extension, the Mooney viscosity of the bimodal oil-extended product was determined by using the ML method as well as the MST method. From this data, the Mooney viscosity of the blend without oil extension was calculated based upon the following relationship: ML at 30 phr oil=10^[(100/130)/(100/100+oil phr)*Log(ML)].

TABLE I

| EPDM | 1 | 2 | 3 | 4 |
|---|---|---|---|---|
| Reactor Configuration | Parallel | Parallel | Series | Series |
| Fraction 1 Measured Mooney | | | | |
| MU (ML, 1 + 4 @ 125° C.) | 57.6 | 58.4 | 13.3 | 36.3 |
| Ethylene Unit Content (wt % uncorrected) | 63.43 | 64.46 | | |
| Diene Unit Content (wt % uncorrected) | | | | |

TABLE I-continued

| EPDM | 1 | 2 | 3 | 4 |
|---|---|---|---|---|
| Weight Fraction (%) | 49.2 | 49.1 | 50.7 | 51.0 |
| Fraction 2 Measured Mooney | | | | |
| MU (MST, 5 + 4 @ 200° C.) | 49.4 | 50.6 | na | na |
| Calculated Mooney | | | | |
| MU (ML, 1 + 4 @ 125° C.) | 253 | 260 | 661 | 380 |
| Ethylene Unit Content (wt % uncorrected) | 62.57 | 62.41 | 64.39 | 63.99 |
| Diene Unit Content (wt % uncorrected) | 4.29 | 4.42 | 4.73 | 4.71 |
| Weight Fraction (%) | 50.8 | 50.9 | 49.3 | 49.0 |
| BLEND WITHOUT OIL EXTENSION Measured Mooney | | | | |
| MU (MST, 5 + 4 @ 200° C.) | na | na | 21.4 | 23 |
| Calculated Mooney | | | | |
| MU (ML, 1 + 4 @ 125° C.) | na | na | 110 | 118 |
| OIL-EXTENDED BLEND Measured Mooney | | | | |
| MU (ML, 1 + 4 @ 125° C.) | 70 | 61 | 56 | 61 |
| OIL (PHR) | 27.9 | 33.5 | 32.6 | 31.3 |
| Calculated Mooney | | | | |
| MU (MST, 5 + 4 @ 200° C.) | 15.2 | 15.0 | 9.7 | 12.0 |
| MU (ML, 1 + 4 @ 125° C.) ZERO OIL | 230.7 | 241.6 | 206.9 | 219.6 |

The oil-extended bimodal polymers described in Table I were then used in the preparation of thermoplastic vulcanizates using the recipes provided in Table II.

TABLE II

| TPV FORMULATION | A | B | C |
|---|---|---|---|
| EPDM | 100 | 100 | 100 |
| Polypropylene | 40 | 50 | 234 |
| Pre-cure Oil | 85.80 | 87.90 | 82.80 |
| Stannous Chloride | 1.67 | 1.67 | 2.2 |
| ZnO | 1.50 | 1.50 | 1.50 |
| Carbon Black/PP | 24.5 | 24.5 | 21.12 |
| Curative/Oil | 10.30 | 12.60 | 15.30 |
| Post-cure Oil | 43.00 | 38.00 | 46.00 |
| Total Oil | 128.80 | 125.90 | 128.80 |

Thermoplastic vulcanizates were prepared by dynamically vulcanizing the rubber within a twin-screw extruder using continuous processing techniques known in the art. The solid ingredients were added to the feed throat of the extruder and underwent mixing and masticating to achieve a blend wherein the polypropylene was in its molten state. Oil was added to the extruder both before and after cure as set forth in Table II. The amount of pre-cure oil identified within Table II includes the amount of oil extended into the rubber plus the amount of oil added to the extruder prior to the addition of the curative. Post-cure oil was added after the addition of the curative. The zinc oxide and stannous chloride were introduced to the reactor (twin screw extruder) with the other solid ingredients.

The homopolypropylene employed throughout the examples had an MFR of 0.8 and was obtained under the tradename PP5341 (ExxonMobil Chemical Company) and/or F008F (Braskem). Carbon black was delivered to the extruder as a masterbatch with 0.8 MFR polypropylene. The curative was a phenolic resin curative that was delivered to the extruder as a 30% active mixture within paraffinic oil. The phenolic resin was a resole-type resin, that included a blend of octylphenol and nonylphenol formaldehyde. Post-cure oil was Paramount 6001 (Chevron); pre-cure oil added as process oil was Paramount 6001, and pre-cure oil as extender oil in the rubber was also Paramount 6001 for numbered samples, while for those samples labeled Control, extender oil in the rubber was Sunpar 150 (HollyFrontier). Further, in those samples labeled Control, the rubber employed was obtained under the tradename Vistalon™ 3666 (ExxonMobil Chemical Company), which is an oil-extended mono-modal EPDM characterized by having a diene content of about 3.9 weight percent, an oil-extended Mooney viscosity (ML,1+4@125° C.) of about 52, an intrinsic viscosity (dl/g) in decalin at 135° C. of about 4 dl/g, a weight average molecular weight of about 850 kg/mole, a number average molecular weight of about 170 kg/mole, an ethylene content of about 64 weight percent, a paraffinic oil content of 75 phr.

The data provided in Table III corresponds to those thermoplastic vulcanizates prepared according to recipe A of Table II.

TABLE III

| TPV | C1 | I1 | I2 | I3 | I4 |
|---|---|---|---|---|---|
| EPDM | Control | 1 | 2 | 3 | 4 |
| Hardness (Shore A) | 68 | 66.2 | 65.8 | 65.8 | 65.8 |
| LCR (Pa · sec) | 81.73 | 94.8 | 91.28 | 95.26 | 89.06 |
| Moisture (%) | 0.02 | 0.03 | 0.03 | 0.02 | 0.02 |
| ESR (micro inches) | 56.7 | 73 | 86.9 | 84.2 | 69.6 |
| CSET (22 hrs/70° C.) (%) | 28 | 30 | 22 | 23 | 24 |
| CSET (70 hrs/125° C.) (%) | 45 | 46 | 45 | 39 | 46 |
| Ultimate Stress (MPa) | 6.349 | 7.806 | — | 7.314 | 6.912 |
| Ultimate Strain (%) | 455 | 477 | — | 470 | 566 |
| M100 (MPa) | 2.83 | 2.96 | — | 2.71 | 2.45 |
| M200 (MPa) | 3.82 | 4.24 | — | 3.96 | 3.45 |
| M300 (MPa) | 4.75 | 5.44 | — | 5.14 | 4.37 |
| Specific Gravity | 0.968 | 0.972 | 0.95 | 0.964 | 0.971 |

Hardness was determined according to ISO 868 with a fifteen-second time interval. LCR viscosity was determined according to ISO 11443 at 204° C. Compression Set was determined according to ASTM D 395D at 25% compression for 24 hours at 70° C. and 125° C. Modulus (100%, 200%, and 300%), ultimate stress, and ultimate strain (ultimate elongation), were determined according to ISO 37 at 23° C. at 50 mm per minute by using an Instron testing machine. Weight gain was determined according to ASTM D-471 at 121° C. after 24 hours.

Extrusion surface roughness ("ESR") is reported as an arithmetic average of surface irregularity (Ra) in microinches (or micrometers, where indicated). Surface irregularity is measured as follows: approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner. ESR was measured on the samples using a model EMD-04000-W5 Surfanalyzer System 4000 including a universal probe 200 mg stylus force and a Surfanalyzer proper tip type EPT-01049 (0.025 mm (0.0001") stylus radius).

The data in Table III shows that thermoplastic vulcanizates (I1-I4) can be prepared by using metallocene-synthesized bimodal EPDM and that the thermoplastic vulcanizates have an overall balance of properties on par with the thermoplastic vulcanizates (C1) prepared using conventional mono-modal EPDM prepared using Zeigler Natta catalysis. Surprisingly, the thermoplastic vulcanizates of I1-I4 had surface properties, as demonstrated by ESR, that were within acceptable ranges of deviation from the conventional TPV $C_1$.

The data provided in Table IV corresponds to those thermoplastic vulcanizates prepared according to recipe B of Table II.

TABLE IV

| TPV | C2 | I5 | I6 |
|---|---|---|---|
| EPDM | Control | 1 | 2 |
| Hardness (Shore A) | 70.2 | 64.8 | 65.2 |
| LCR (Pa · sec) | 81.6 | 93.52 | 89.42 |
| Moisture (%) | 0.02 | 0.02 | 0.02 |
| ESR (micro inches) | 31 | 73.3 | 59.3 |
| CSET (22 hrs/70 C.) (%) | 29 | 24 | 26 |
| CSET (70 hrs/125 C.) (%) | 45 | 42 | 45 |
| Ultimate Stress (MPa) | 7.276 | 7.023 | 7.409 |
| Ultimate Strain (%) | 503 | 422 | 460 |
| M100 (MPa) | 3.24 | 2.81 | 2.85 |
| M200 (MPa) | 4.21 | 4.13 | 4.12 |
| M300 (MPa) | 5.14 | 5.39 | 5.33 |
| Specific Gravity | 0.974 | 0.974 | 0.972 |

The data in Table IV shows that thermoplastic vulcanizates (I5-I6) can be prepared by using oil-extended metallocene-synthesized bimodal EPDM and that the thermoplastic vulcanizates have an overall balance of properties on par with the thermoplastic vulcanizates (C2) prepared using conventional mono-modal EPDM prepared using Zeigler Natta catalysis. Surprisingly, the thermoplastic vulcanizates of I5-I6 had surface properties, as demonstrated by ESR, that were within acceptable ranges of deviation from the conventional TPV C2.

The data provided in Table V corresponds to those thermoplastic vulcanizates prepared according to recipe C of Table II.

TABLE V

| TPV | C3 | I7 | I8 | I9 | I10 |
|---|---|---|---|---|---|
| EPDM | Control | 1 | 2 | 3 | 4 |
| Shore A | 93.2 | 92.6 | 93 | 92.6 | 92.4 |
| LCR | 96.08 | 96.49 | 91.78 | 98.23 | 89.51 |
| Moisture (%) | 0.01 | 0.02 | 0.02 | 0.02 | 0.02 |
| ESR (plaques) | 37.3 | 84.1 | 53.5 | 41.6 | 36.4 |
| CSET (22 hrs/70 C.) (%) | — | — | — | — | — |
| CSET (70 hrs/125 C.) (%) | — | — | — | — | — |
| Ultimate Stress | 16.245 | 18.049 | 17.972 | 18.062 | 16.598 |
| Ultimate Strain (%) | 648 | 701 | 712 | 761 | 713 |
| M100 | 9.26 | 9.21 | 9.23 | 8.98 | 8.82 |
| M200 | 9.45 | 9.45 | 9.47 | 9.27 | 9.08 |
| M300 | 9.97 | 10 | 9.98 | 9.82 | 9.57 |
| Specific Gravity | 0.949 | 0.95 | 0.956 | 0.942 | 0.948 |

The data in Table V shows that thermoplastic vulcanizates (I7410) can be prepared by using metallocene-synthesized bimodal EPDM and that the thermoplastic vulcanizates have an overall balance of properties on par with the thermoplastic vulcanizates (C3) prepared using conventional monomodal EPDM prepared using Zeigler Natta catalysis. Surprisingly, the thermoplastic vulcanizates of I7-I10 had surface properties, as demonstrated by ESR, that were within acceptable ranges of deviation from the conventional TPV C3.

Various modifications and alterations that do not depart from the scope and spirit of this invention will become apparent to those skilled in the art. This invention is not to be duly limited to the illustrative embodiments set forth herein.

What is claimed is:

1. A process for producing a thermoplastic vulcanizate, the process comprising:
   (i) charging a reactor with an oil-extended olefinic copolymer rubber, where the rubber is synthesized by a single-site catalyst, characterized by a multi-modal molecular weight distribution, and includes greater than 10 parts by weight extender oil per 100 parts by weight rubber;
   (ii) charging the reactor, contemporaneously or sequentially with respect to the rubber, with a thermoplastic resin, a process oil, and a cure system to provide a pre-vulcanized mixture; and
   (iii) mixing the rubber, thermoplastic resin, oil, and cure system at a temperature above the melt temperature of the thermoplastic resin to thereby cause dynamic vulcanization of the rubber and produce the thermoplastic vulcanizate.

2. The process of claim 1, where the single-site catalyst is a metallocene catalyst.

3. The process of claim 1, where the oil-extended olefinic copolymer rubber includes (i) a first polymer fraction having a Mooney viscosity (ML, 1+4@125° C.) of less than 125 and (ii) a second polymer fraction having a Mooney viscosity (MST, 5+4@200° C.) of greater than 30.

4. The process of claim 3, wherein the first polymer fraction has a Mooney viscosity (ML, 1+4@125° C.) of from 15 to 100.

5. The process of claim 3, where second polymer fraction has a Mooney viscosity (MST, 5+4@200° C.) of from 40 to 140.

6. The process of claim 1, where the oil-extended olefinic copolymer rubber includes 50 wt % or more of the second polymer fraction.

7. The process of claim 1, where the oil-extended rubber has an overall Mooney viscosity (ML, 1+4@125° C.) of from about 30 to about 100.

8. The process of claim 1, where the oil-extended rubber has an overall Mooney viscosity (ML, 1+4@125° C.) of from about 40 to about 85.

9. The process of claim 1, where the oil-extended olefinic copolymer rubber has been oil-extended by a process comprising:
   (A) polymerizing olefin monomers having two or more carbon atoms in the presence of the single-site catalyst in a polymerization reactor train;
   (B) obtaining a polymer reactor effluent comprising a homogeneous fluid phase polymer-monomer mixture from the reactor train;
   (C) adjusting temperature and/or pressure of the homogeneous fluid phase polymer-monomer mixture so as to create two fluid phases including (i) a polymer-rich phase and (ii) a polymer-lean phase;
   (D) separating the polymer-lean phase from the polymer-rich phase;
   (E) devolatilizing the polymer-rich phase so as to remove volatile components from the polymer-rich phase, thereby obtaining a solid polymer product comprising the oil-extended olefinic copolymer rubber; and
   (F) feeding one or more extender oils to the process after (B).

10. The process of claim 9, wherein the one or more extender oils are fed to the process after the formation of the two fluid phases and before or during the (E) devolatilizing.

11. The process of claim 1, where the oil-extended rubber includes from about 10 to about 60 parts by weight extender oil per 100 parts by weight rubber.

12. The process of claim 1, where the oil-extended rubber is a terpolymer of ethylene, propylene, and 5-ethylidene-2-norbornene, and where the thermoplastic resin is a propylene-based thermoplastic.

13. The process of claim 1, where charging the reactor with process oil includes charging sufficient oil to provide the pre-vulcanized mixture with from about 60 to about 100 parts by weight oil per 100 parts by weight rubber.

14. The process of claim 1, further comprising the step of introducing post-cure oil to the thermoplastic vulcanizate.

15. A thermoplastic vulcanizate prepared by the process of claim 1.

* * * * *